United States Patent
Tsai et al.

(10) Patent No.: US 11,748,982 B2
(45) Date of Patent: *Sep. 5, 2023

(54) MODULAR SYSTEM FOR AUTOMATIC HARD DISK PROCESSING AND VERIFICATION

(71) Applicant: Google LLC, Mountain View, CA (US)

(72) Inventors: Ray Tsai, Chunghua (TW); Randall First, Chunghua (TW)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,437

(22) Filed: Jul. 21, 2022

(65) Prior Publication Data

US 2022/0358758 A1    Nov. 10, 2022

Related U.S. Application Data

(63) Continuation of application No. 17/120,985, filed on Dec. 14, 2020, now Pat. No. 11,410,417.

(60) Provisional application No. 63/066,529, filed on Aug. 17, 2020.

(51) Int. Cl.
*G06V 10/25*    (2022.01)
*G06V 20/10*    (2022.01)
*G06K 19/06*    (2006.01)
*G06F 18/24*    (2023.01)

(52) U.S. Cl.
CPC ............ *G06V 20/176* (2022.01); *G06F 18/24* (2023.01); *G06K 19/06028* (2013.01); *G06V 10/25* (2022.01)

(58) Field of Classification Search
CPC .. G06V 20/176; G06V 10/25; G06V 2201/06; G06V 2201/10; G06K 9/6267; G06K 19/06028; G06K 9/6268; G06K 7/10861; G06T 2207/10016; G06T 2207/20081; G06T 7/0008; G06T 7/001
USPC .......................................................... 382/103
See application file for complete search history.

(56) References Cited

U.S. PATENT DOCUMENTS

| | | |
|---|---|---|
| 6,988,610 B2 | 1/2006 | Fromme et al. |
| 8,469,261 B2 | 6/2013 | Bonner et al. |
| 9,919,876 B2 | 3/2018 | Collot |
| 10,504,020 B2 | 12/2019 | Trenholm et al. |
| 2016/0107312 A1 | 4/2016 | Morrill et al. |

(Continued)

OTHER PUBLICATIONS

Extended European Search Report for European Patent Application No. 21155966.1 dated Jul. 22, 2021. 8 pages.

(Continued)

*Primary Examiner* — Stephen P Coleman
(74) *Attorney, Agent, or Firm* — Lerner David LLP

(57) ABSTRACT

A method of using a conveyor system comprising capturing, with a first camera of the conveyor system, a first image of a server tray and a plurality of hard disks received along a first conveyor belt of the conveyor system, checking, with one or more processors of the conveyor system, a first serial number associated with the server tray and a second set of serial numbers associated with the plurality of hard disks against a reference list of serial numbers, capturing, with a second camera of the conveyor system, a second image of the server tray and the plurality of hard disks, and verifying an integrity status of the server tray and plurality of hard disks based on the second image.

20 Claims, 10 Drawing Sheets

(56) References Cited

U.S. PATENT DOCUMENTS

| | | |
|---|---|---|
| 2017/0033839 A1 | 2/2017 | Abbondanzio et al. |
| 2017/0103290 A1 | 4/2017 | Guionneau et al. |
| 2018/0247081 A1 | 8/2018 | Helsel et al. |
| 2018/0366357 A1* | 12/2018 | Liao ..................... G06T 7/0008 |
| 2020/0005422 A1 | 1/2020 | Subramanian et al. |

OTHER PUBLICATIONS

Zhang, et al., A Computer Vision Based Conveyor Deviation Detection System, Apr. 1, 2020, 10 pages.

* cited by examiner

900

| Capturing a first image of a server tray and a plurality of hard disks received along a first conveyor belt of the conveyor system | — 910 |

| Checking a first serial number associated with the server tray and a second set of serial numbers associated with the plurality of hard disks against a reference list of serial numbers | — 920 |

| Capturing a second image of the server tray and the plurality of hard disks | — 930 |

| Verifying an integrity status of the server tray and plurality of hard disks | — 940 |

Fig. 5

MODULAR SYSTEM FOR AUTOMATIC HARD DISK PROCESSING AND VERIFICATION

CROSS-REFERENCE TO RELATED APPLICATIONS

The present application is a continuation of U.S. patent application Ser. No. 17/120,985, filed on Dec. 14, 2020, which claims the benefit of the filing date of U.S. Provisional Patent Application No. 63/066,529 filed Aug. 17, 2020, the disclosures of which are hereby incorporated herein by reference.

BACKGROUND

Proper maintenance of a data center is pivotal in ensuring that the data center operates efficiently. Such maintenance includes consistently replacing data center components, such as hard disks that malfunction, become too full, or the like. Once a hard disk has been identified as requiring replacement, the server tray containing that hard disk is removed from a server rack so that the hard disk can be removed from the server tray. The serial number assigned to each hard disk and server tray is then checked to ensure that the correct server tray is selected for replacement. Current practices of replacing data center components, including checking the serial numbers assigned to those data center components, are resource inefficient.

BRIEF SUMMARY

One aspect of the disclosure provides for a method of using a conveyor system comprising capturing, with a first camera of the conveyor system, a first image of a server tray and a plurality of hard disks received along a first conveyor belt of the conveyor system, checking, with one or more processors of the conveyor system, a first serial number associated with the server tray and a second set of serial numbers associated with the plurality of hard disks against a reference list of serial numbers, capturing, with a second camera of the conveyor system, a second image of the server tray and the plurality of hard disks, and verifying an integrity status of the server tray and plurality of hard disks based on the second image. Identifying the first serial number and the second set of serial numbers may include identifying in the first image, with one or more processors of the conveyor system, a first bar code on the server tray and a plurality of bar codes on the plurality of hard disks, and retrieve, with one or more processors of the conveyor system, the first serial number corresponding to the first bar code and the second plurality of serial numbers corresponding to the plurality of bar codes. Verifying the integrity status of the server tray and the plurality of hard disks may include receiving, along an egress station of the conveyor system, the server tray and the plurality of hard disks, identifying, in the second image, an image portion corresponding to at least one of the server tray and the plurality of hard disks, and comparing the image portion to a reference image to determine whether there is a defect image portion on at least one of the first image portion or the second image portion. The plurality of hard disks and server tray may be received along a platform of the egress station, the method further comprising lifting the platform such that the plurality of hard disks and server tray prior to the second camera capturing the second image. The method may further comprise, when the image portion includes the defect image portion, transferring the server tray and the plurality of hard disks to a first drop-off station of the conveyor system, classifying a defect type of the defect image portion, and noting a location of the defect image portion along the image portion. The method may further comprise, when the image portion does not include the defect image portion, transferring the server tray and the plurality of hard disks to a disassembly station of the conveyor system. The method may further comprise removing the plurality of hard disks from the server tray, and transferring the plurality of hard disks to a second drop-off station of the conveyor system. The method may further comprise removing at least one hard disk of the plurality of hard disks from the server tray without removing a set of hard disks of the plurality of hard disks from the server tray, and transferring the at least one hard disk, without the set of hard disks, to the second drop-off station. The method may further comprise capturing, with a third camera coupled to the disassembly station, a third image of the server tray and the plurality of hard disks, identifying in the third image the first bar code on the server tray and the plurality bar codes on the plurality of hard disks, retrieving the first serial number from the first bar code and the second serial number from the second bar code, and checking the first serial number and the second serial number against the reference list of serial numbers to ensure that the first serial number and the second serial number are on the reference list.

Another aspect of the disclosure provides for a conveyor system comprising a first conveyor belt coupled to a first camera, a second camera coupled to the first camera, memory configured to store at least one of instructions or data, and one or more processors operatively coupled to the memory, the one or more processors being configured to capture, with the first camera, a first image of a server tray and a plurality of hard disks that were received along a first conveyor be check a first serial number associated with the server tray and a second set of serial numbers associated with the plurality of hard disks against a reference list of serial numbers based on the first image capture a second image of the server tray and the plurality of hard disks, and verify an integrity status of the server tray and the plurality of hard disks based on the second image. The one or more processors may further be configured to, in identifying the first serial number and the second set of serial numbers identify in the first image a first bar code on the server tray and a plurality of codes on the plurality of hard disks, and retrieve the first serial number corresponding to the first bar code and the second plurality of serial numbers corresponding to the plurality of bar codes. The conveyor system may further comprise an egress station coupled to the first conveyor belt, and a second camera coupled to one of the first camera or the egress station, wherein the second camera is configured to capture a second image of the server tray and the plurality of hard disks received along the egress station, wherein the one or more processors are further configured to, in verifying the integrity status of the server tray and the plurality of hard disks identify, in the second image, an image portion corresponding to at least one of the server tray and the plurality of hard disks, and compare the image portion to a reference image to determine whether there is a defect image portion on the image portion. The egress station may include a platform configured to receive the server tray and plurality of hard disks, the egress station including an actuator operatively coupled to the platform, the actuator configured to lift the platform prior to the second camera capturing the second image. The conveyor system may further comprise a first drop-off station coupled to the egress station, the egress station including a platform configured to when the image portion includes the defect image portion, transfer the server tray and the plurality of hard disks to the first drop-off, and the one or more processors are further configured to classifying a defect type of the defect image portion, and note a location of the defect image portion along the image portion. The conveyor system may include a disassembly station coupled to the egress station and the egress station including a platform configured to, when the image portion does not include the defect image portion, transfer the server tray and the plurality of hard disks to the disassembly station. The conveyor system may further comprise a second drop-off station coupled to the disassembly station and a second conveyor belt coupled to the disassembly station, the disassembly station includes a disassembler configured to remove the plurality of hard disks from the server tray, and transfer the plurality of hard disks to the second drop-off station. The disassembly station may include a disassembler configured to remove at least one hard disk of the plurality of hard disks from the server tray without removing a set of hard disks of the plurality of hard disks from the server tray, and transfer the at least one hard disk, without the set of hard disks, to the second drop-off station. The conveyor system may further comprise a second conveyor belt, wherein the disassembly station includes a pusher configured to transfer the server tray to the second conveyor belt. The conveyor system may further comprise a third camera coupled to the disassembly station, the third camera configured to capture, with the third camera, a third image of the server tray and the plurality of hard disks, wherein the one or more processors are further configured to identify in the third image the first bar code on the server tray and the plurality bar codes on the plurality of hard disks, retrieve the first serial number from the first bar code and the second serial number from the second bar code, and check the first serial number and the second serial number against the reference list of serial numbers to ensure that the first serial number and the second serial number are on the reference list.

Another aspect of the disclosure provides for a method comprising receiving a first image including a server tray and a plurality of hard disks, checking, by the one or more processors, a first serial number associated with the server tray and a second set of serial numbers associated with the plurality of hard disks against a reference list of serial numbers based on the first image, receiving a second image including the server tray and the plurality of hard disks, verifying, by the one or more processors, an integrity status of the server tray and the plurality of hard disks based on the second image, and classifying a defect type of the defect image portion.

BRIEF DESCRIPTION OF THE DRAWINGS

FIG. 5 is an example flowchart depicting the method in accordance with aspects of the disclosure.

DETAILED DESCRIPTION

When replacing components of a data center an order may be manually issued by an operator, or automatically issued by a robot, to a computing device within the data center to replace a component of the data center with a fresh part. For instance, one or more hard disks housed within a server tray may be identified as requiring replacement. This may occur where the hard disk is noted as malfunctioning, full, not optimally performing, or the like. In such an instance, the order may include a list of serial numbers associated with both the server tray and the hard disk received within the server tray.

The technology of this disclosure is directed to a conveyor system for automatically checking whether the server tray and hard disks are the correct server tray and hard disks that need replacement according to the initial order. Moreover, the conveyor system can automatically verify an integrity status of the server tray and hard disks by detecting whether such data center components have any defects, such as physical malformities of the data center component, prior to removing the hard disks from the server tray.

Figure 1A:
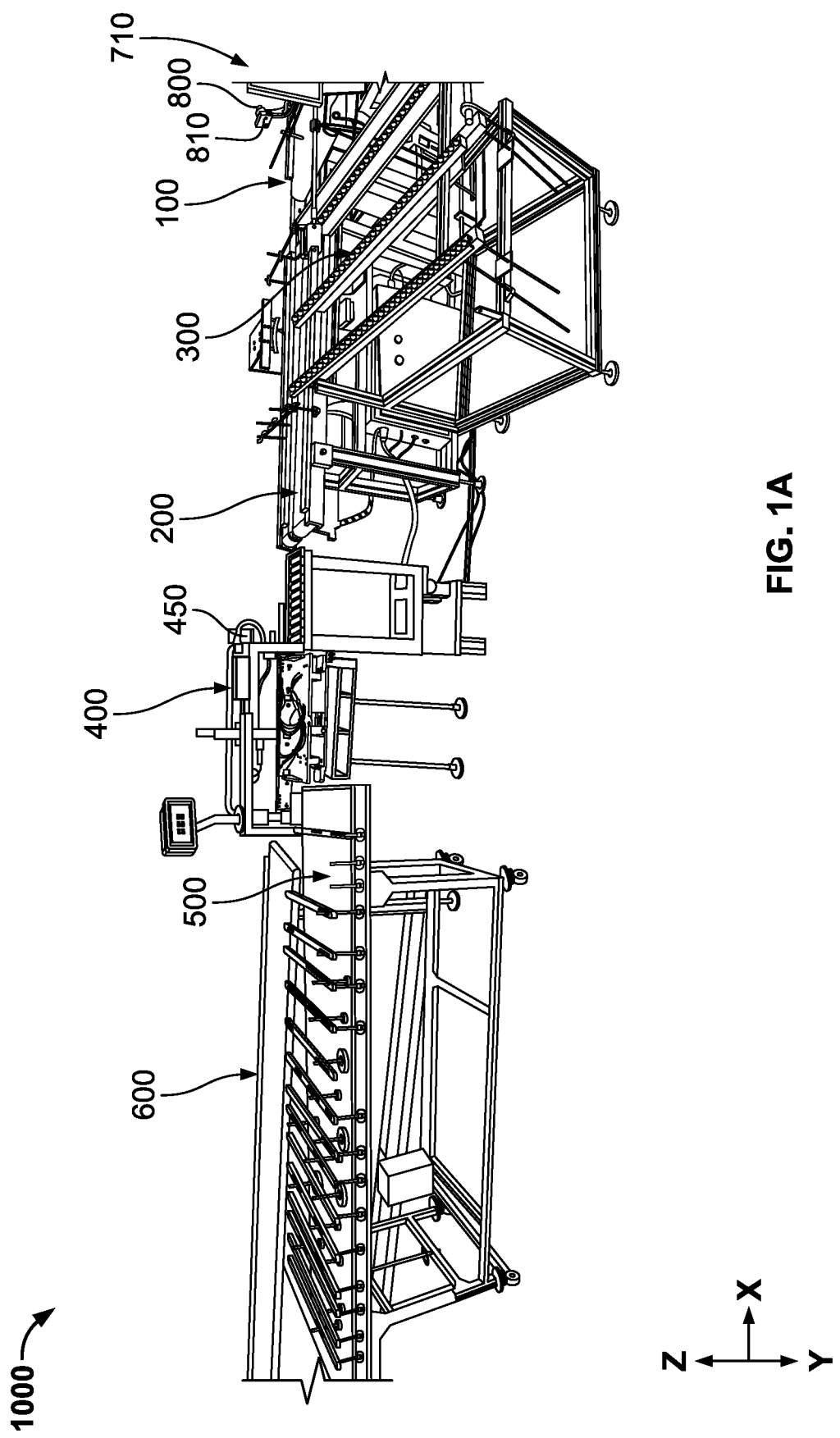
FIG. 1A is an isometric view of a conveyor system in accordance with aspects of the disclosure.

FIG. 1A depicts an isometric view of conveyor system 1000 having a first conveyor belt 100, egress station 200, first drop-off station 300, disassembly station 400, second drop-off station 500, second conveyor belt 600, and computing device 710. Each station of conveyor system 1000 includes a start point and an end point, and a path defined between the start point and the end point. In this manner, an object (not shown), such as parts for a data center (e.g., server trays housing a plurality of hard disks), or other data center components, can be transported by a certain station of conveyor system 1000 from the start point to the end point along the path defined between those two points. Moreover, each end point of each station can be coupled to the start point of an adjacent station, or along a length of the adjacent station.

Conveyor belts 100, 600 can be any form of conveyance system known in the art that is capable of supporting and transporting an object along the path defined between the starting and end points, such as a straight path along the X-axis, as depicted in FIG. 1A. For example, as depicted further below, first and second conveyor belts 100, 600 can be made of a plurality of cylindrical rollers aligned along the same plane while being offset from each other. Conveyor belts 100, 600 can additionally include a belt overlaid on top of the rollers however, in other examples, the conveyor only includes a belt without any rollers. In yet other examples, conveyor belts 100, 600 can be a set of linkages, tiles, or plates engaged with each other and forming a surface to support an object during transportation. The rollers, belt, or linkages of any example of conveyor belts 100, 600 can be freely movable or can be moved through a motorized actuation. For example, where conveyor belts 100, 600 include rollers, such rollers can be freely rotatable such that an object can slide on the rollers through an external force pushing the object. Alternatively, the rollers can be motorized such that the object can be transported along the rollers without an external force by continuously rotating the rollers through a motorized operation known in the art. The paths defined by conveyor belts 100, 600 can be any shape, including straight or curved.

Figure 1B:
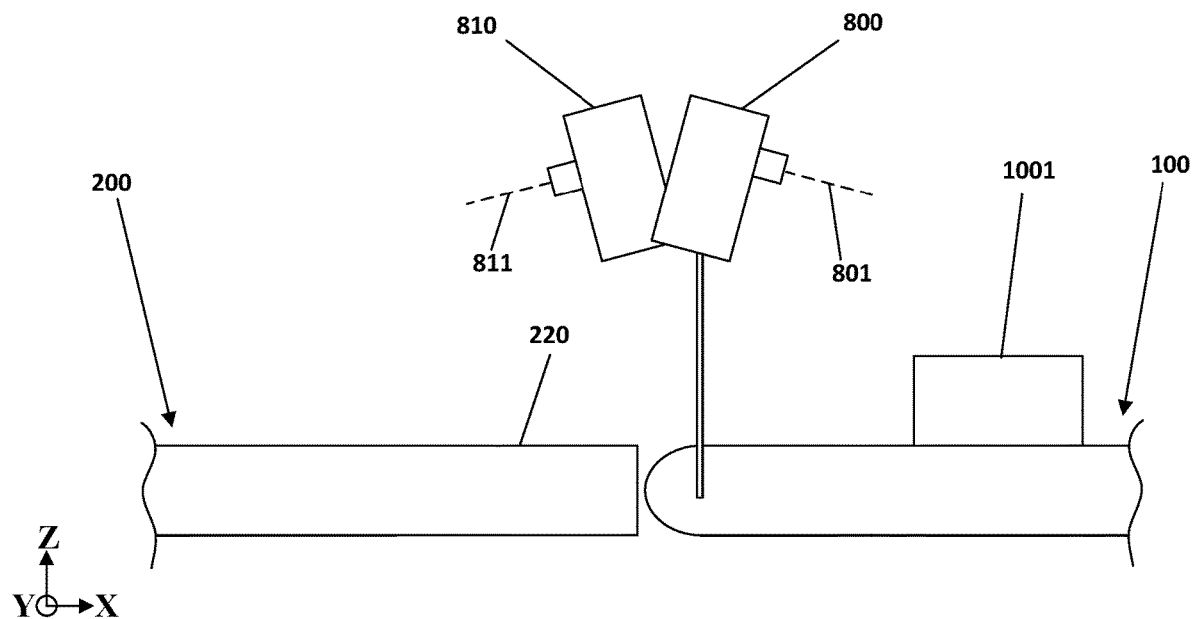
FIGS. 1B-1C is a profile view of first and second camera in accordance with aspects of the disclosure.
Figure 1C:
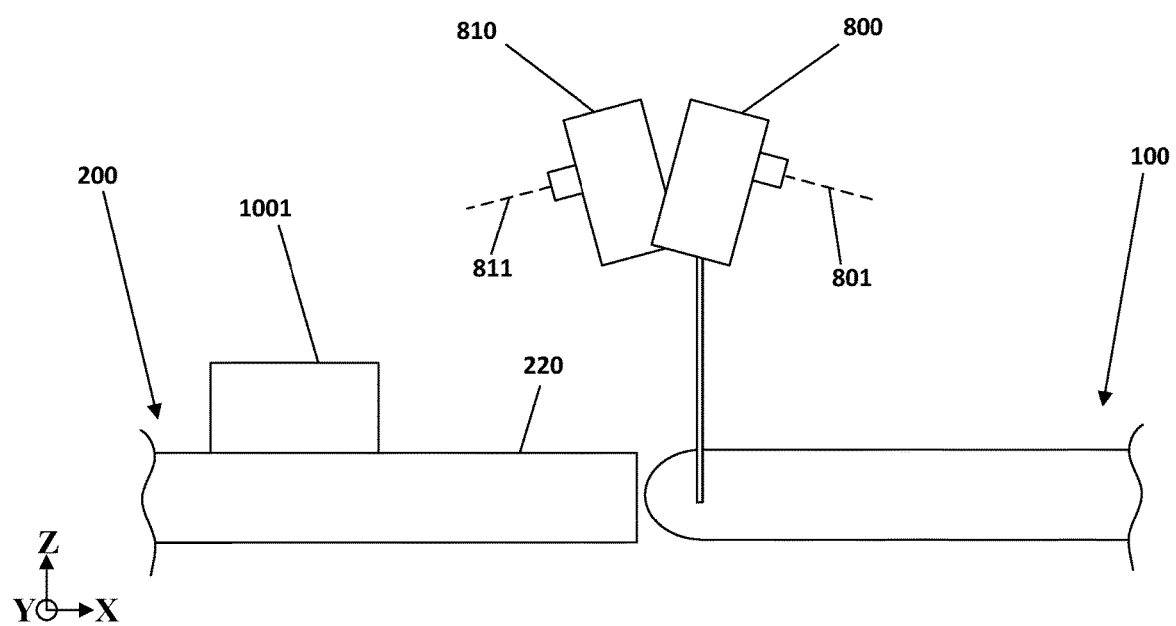

FIGS. 1B-1C depicts a profile representation of cameras 800, 810 and object 1001 being transported from first conveyor belt 100 to egress station 200. Cameras 800, 810 can be any type of image capture device known in the art. As depicted in FIG. 1B, first camera 800 can be coupled to an end point of conveyor belt 100 facing a first camera direction 801 toward the conveyor belt to capture a first image of object 1001 as it is being transported toward the end point of the conveyor belt, similar to first image 1300 shown in FIG. 7. First camera 800 can be facing down toward first conveyor belt 100 along first camera direction 801 such that the first image can be from a downward perspective or view in a Z-direction along the X-Z plane toward object 1001 as the object is transported along the first conveyor belt. This first image can be sent to computing device 710 to be, for instance, scanned for bar codes located on the object that correspond to a part serial number, as further described below.

Figure 9:
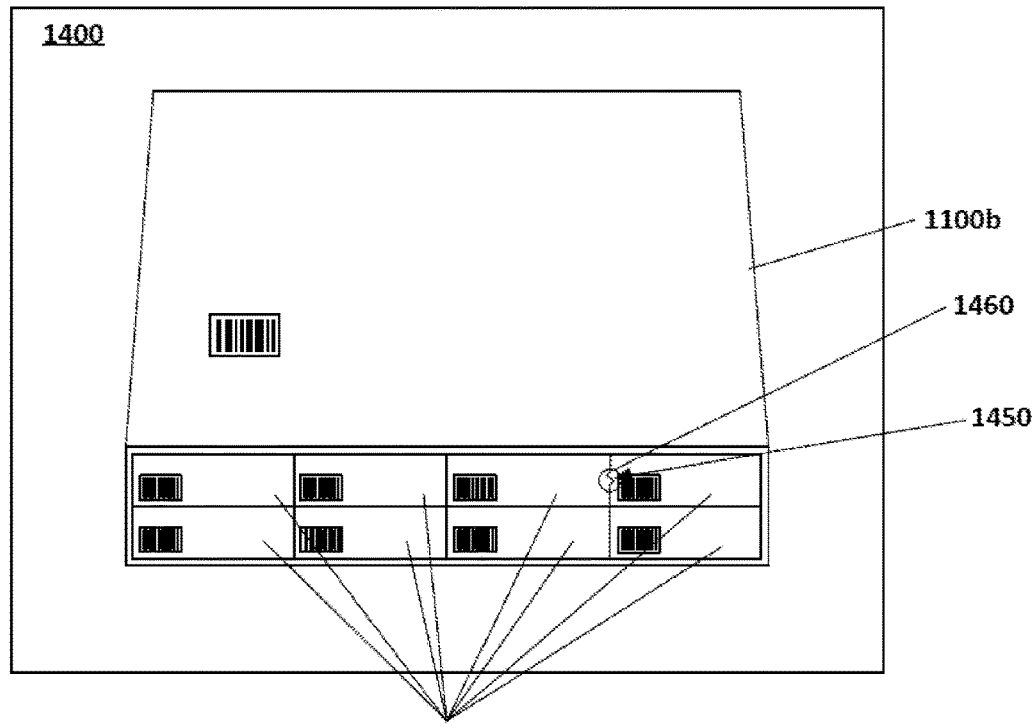
FIG. 9 is an isometric view of an image captured by a camera in accordance with aspects of the disclosure.

Second camera 810 can be coupled to first camera 800 facing a second camera direction 811, in an opposite direction along the X-axis than first camera direction 801 of first camera 800. As depicted in FIG. 1C, second camera 810 can face a second camera direction 811 directed toward egress station 200 to capture a second image of object 1001 once the object is transferred to platform 220, similar to image 1400 as shown in FIG. 9. Similar to camera 800, second camera direction 811 of second camera 810 can be facing in a downward direction in a Z-direction along the X-Z plane toward the object and egress station 200 as the object is transferred to the egress station. In this manner, camera 800 can take a second image to be sent to computing device 710 to be, for instance, analyzed for physical defects, as discussed further below.

Figure 2:
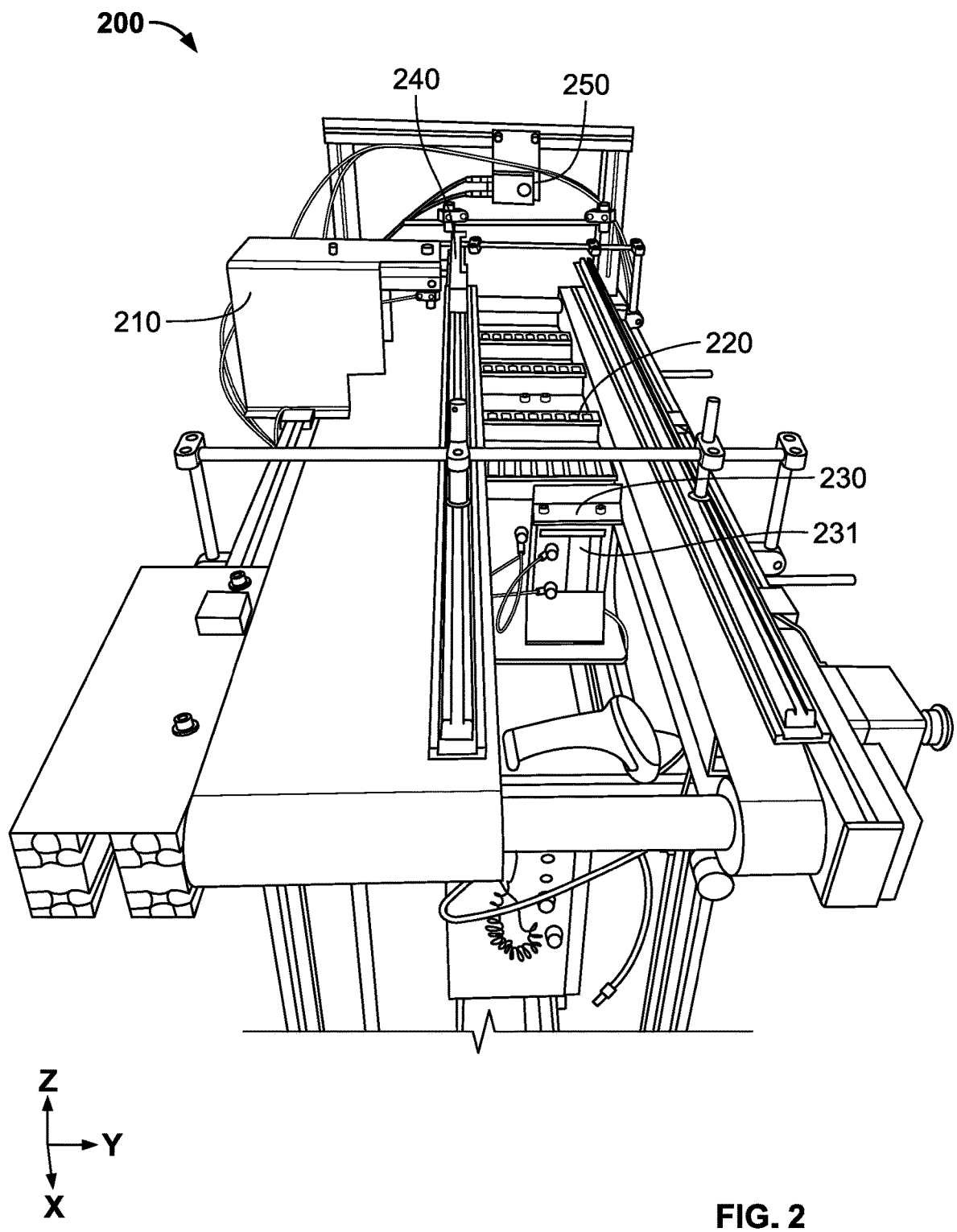
FIG. 2 is an isometric view of an egress station in accordance with aspects of the disclosure.

FIG. 2 depicts egress station 200 coupled to first conveyor belt 100, and can include a first first stop 230, a platform 220, and a second actuator 210 operatively coupled to a pusher 240. Although platform 220 is depicted as having a number of struts with rollers along its length, the platform can be any shape capable of receiving the object from conveyor belt 100, such as being a flat surface or the like. In this manner, an object (not shown) can be transported along conveyor belt 100 in the X-direction until the object reaches an end point of the conveyor belt, at which point the conveyor belt transfers the object onto the platform 220 of egress station 200.

Egress station 200 includes a third camera 250 similar to cameras 800, 810 except the third camera is facing along the X-direction. In this manner, once an object is received on platform 220, the platform can be raised such that the object is facing substantially orthogonal to third camera 810. Third camera 810 can then capture a profile view of the object, such as a front and/or side view of a server tray and a plurality of hard disks. This profile view of the object allows for the image taken by third camera 250 to include a normalized view of the objects received along platform 220 so that a computing device, such as computing device 710, can more consistently analyze the objects received on the platform for certain physical defects, as discussed further below.

In other examples, first camera 800 can be attached to conveyor belt 100 while second camera 810 can be attached to egress station 200. In yet another example, there may be two cameras attached to egress station 200. In a yet further example, there can be more than two cameras 800, 810 such as three, four, or the like. Moreover, in other examples, the first and second directions can face any direction. For instance, the first direction of first camera 800 can be facing substantially parallel to a plane defined by conveyor belt 100 while the second direction of second camera 810 can be facing down toward platform 220 of egress station 200.

Platform 220 can be operatively coupled to a first actuator (not shown), such as a pneumatic motor, hydraulic motor, servo motor, or any other motorized device that can move the platform, while a pusher 240 can be operatively coupled to a second actuator 210 similar to the first actuator. In this manner, the first actuator can raise or lower platform 220 along a Z-direction while second actuator 210 can extend or retract pusher 240 along a Y-direction. For example, platform 220 can be raised in a Z-direction to a certain height by the first actuator so that the object can be transferred to a different part of conveyor system 1000, such as first drop-off station 300, as shown in FIG. 1, by pusher 210 pushing the object along a horizontal direction towards the first drop-off station through the second actuator. The height of platform 220 in the raised position can additionally be the same height for third camera 250 to capture an image of the object as well as for egress station 200 to transfer the object. This is beneficial because an analysis of this image can be performed immediately after third camera 250 captures the image to verify an integrity status of the object and, if a decision based on this image is made to transfer the object (such as for pusher 240 to transfer the object to first drop-off station 300 after computing device 710 detects a physical defect), platform 220 does not have to be further raised or lowered in order to do so.

First stop 230 is a substantially rectangular block extending along the Z-Y plane. Actuator 231 can cause first stop 230 to rise up along the Z-direction when an object is received along platform 220. In this manner, first stop 230 can prevent an object from moving past platform 220 along the X-direction. Actuator 231 is similar to the actuators discussed above.

Turning back to FIG. 1, first drop-off station 300 is coupled to egress station 200 while second drop-off station 500 is coupled to disassembly station 400. Drop-off stations 300, 500 can have a structure similar to conveyor belts 100, 600. In this manner, an object (not shown) can be transferred onto first drop-off station 300 in any orientation, and can smoothly roll or slide onto the first drop-off station to a stop. The object can then be retrieved from the first drop-off station 300 by an operator, such as a human or a robot. In other examples, drop-off stations 300, 500 can simply be a planar surface. In a yet further example, drop-off stations 300, 500 can be a set of struts rotatably housing a number of spheres along their lengths. In this example, the object can be received along the surface of the spheres. Further examples of drop-off stations 300, 500 can have one or more stops (not shown) along a surface or portion of the drop-off stations to prevent the object received along the drop-off stations from travelling too far and falling off the drop-off stations.

Figure 3:
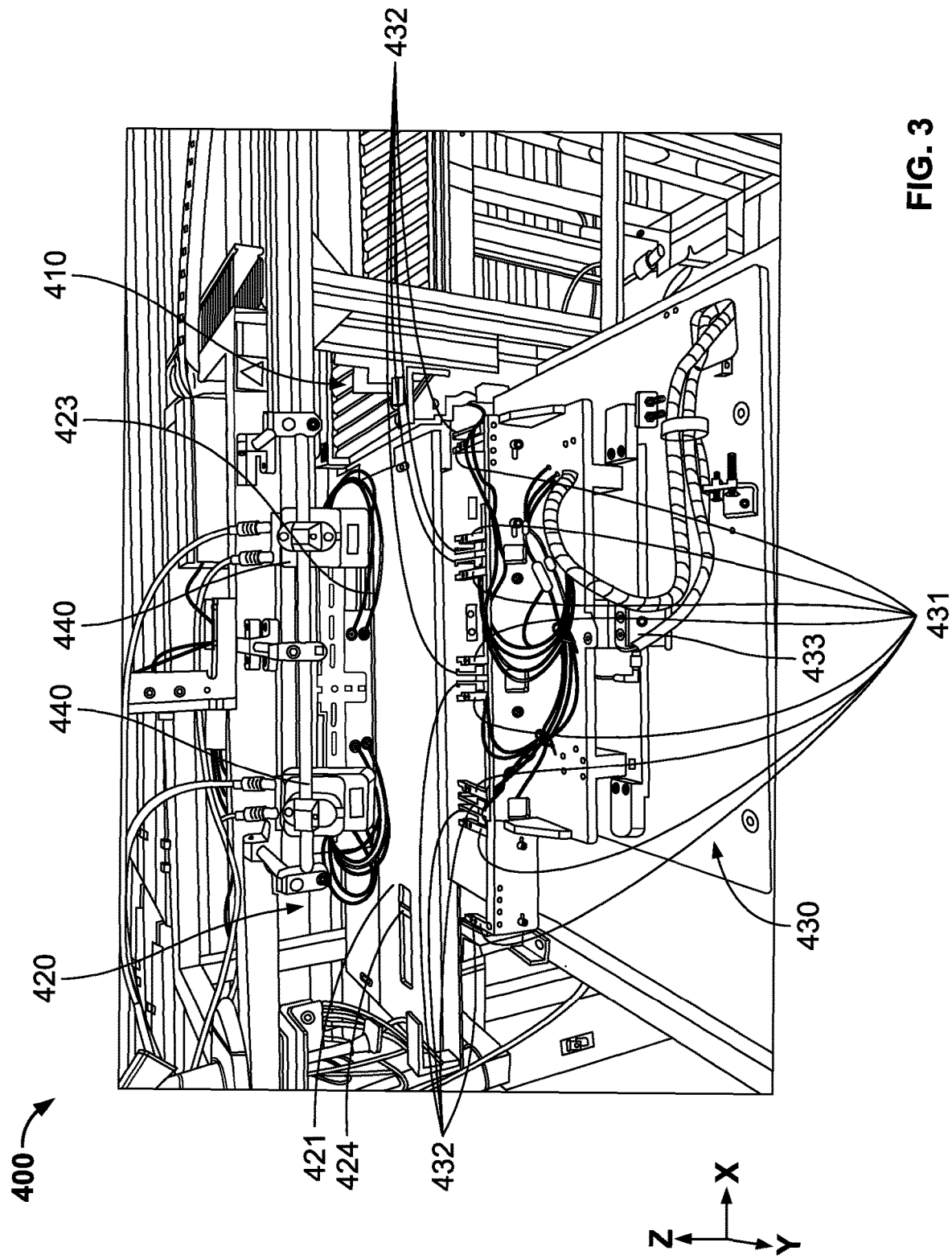
FIG. 3 is an isometric view of a disassembly station in accordance with aspects of the disclosure.
Figure 7:
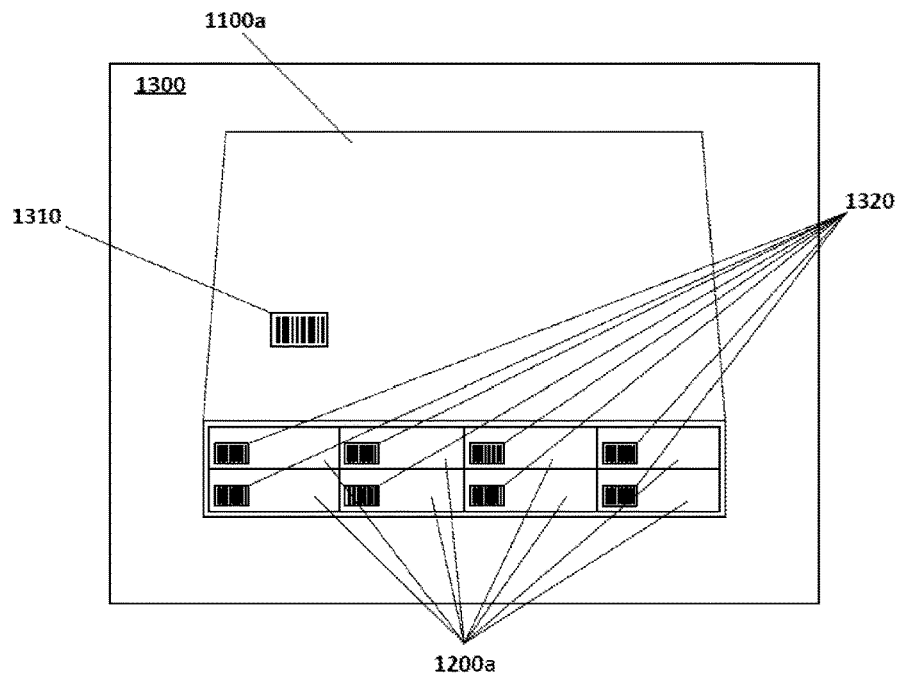
FIG. 7 is an isometric view of a first image captured by a camera in accordance with aspects of the disclosure.

FIGS. 1A and 3 depict disassembly station 400 coupled to egress station 200. Disassembly station 400 includes a conveyor portion 410, a work portion 420, a disassembler 430, cameras 440, and pusher 450. Conveyor portion 410 can have a structure similar to conveyor belts 100, 600, as described above. Conveyor portion 410 has a start point and an end point, and a path defined between the start point and the end point along the X-axis. Work portion 420 is coupled to the end point of conveyor portion 410. In this manner, conveyor portion 410 can receive an object (not shown) from a start point and be transported to an end point to be transferred to work portion 420. Cameras 440 are similar to cameras 250, 800, 810, as shown in FIGS. 1 and 2, above. Specifically, cameras 440 can perform a similar function to first camera 800 by capturing an image to be sent to computing device 710 so that the image can be scanned for bar codes associated with a serial part number, similar to first image 1300 as shown in FIG. 7. Pusher 450 is similar to pusher 240 of egress station 200, except pusher 450 can push an object laterally along the length of disassembly station 400 in an X-direction.

Work portion 420 includes a work platform 421, a back stop 423, and a second stop 424. Work platform 421 is a substantially planar surface coupled to the end point of conveyor portion 410. Work platform 421 can receive an object transferred by conveyor portion 410. Back stop 423 is a substantially rectangular block secured opposite disassembler 430 on work platform 421 along the width of the work platform along the Y-direction. Back stop 423 can prevent movement of an object received on work platform 421 along the Y-direction by providing a surface against which the object can abut against when a force is applied to the object along the Y-direction. Similarly, second stop 424 is a substantially rectangular block. Second stop 424 can be actuated by an actuator to prevent an object received along platform 421 from moving too far along the X-direction.

Disassembler 430 includes fingers 431, grippers 432, and actuator 433. Actuator 433 is similar to actuator 210 and can be a servo motor or the like. Actuator 433 can control translational, such as along a Y-direction, and rotational movement of disassembler 430, such as about a Z-axis, as well as movement of grippers 432. Fingers 431 extend from along the length of disassembler 430 toward work platform 421 along the Y-direction. Fingers 431 can be received within slots or openings in an object (not shown), such as slots defined by a server tray, to help align the server tray with disassembler 430. In this manner, an object, such as a server tray, can be held in place by fingers 431 along the X-direction and between disassembler 430 and back stop 423 along the Y-direction. Grippers 432 also extend from the length of disassembler 430 toward work platform 421 along the Y-direction. Grippers 432 are longer in length than fingers 431 and have a hook or protrusion extending laterally from the grippers. The lateral protrusions of grippers 432 can assist in engaging an object, or a portion of an object, such as a number of hard disks housed within a server tray that is held in place by fingers 431 and back stop 423. Each hard disk can be engaged between two grippers 432 such that each lateral protrusion on the grippers extends towards the hard disk. As such, actuator 433 can move disassembler 430, such as in a direction away from work platform 421, to unseat or disengage the hard disks from the server tray.

In other examples, there can be more or less than eight fingers and grippers, such as seven, nine, or the like. Moreover, while FIG. 3 depicts four sets of fingers 431 and grippers 432, each set having two fingers and grippers, there may be any number of sets of fingers and grippers. For example, there may be more or less than four sets of fingers 431 and grippers 432 along the length of disassembler 430. In another example, there may be a number of sets of fingers 431 and grippers 432 vertically stacked on each other, such as two stacks of four sets of fingers 431 and grippers 432.

Cameras 440 can take yet another image once the hard disks are removed from the server tray. Computing device 710 can analyze this image to determine whether all the hard disks have been removed. For instance, computing device 710 can compare this image with a reference image of an empty server tray.

Figure 4:
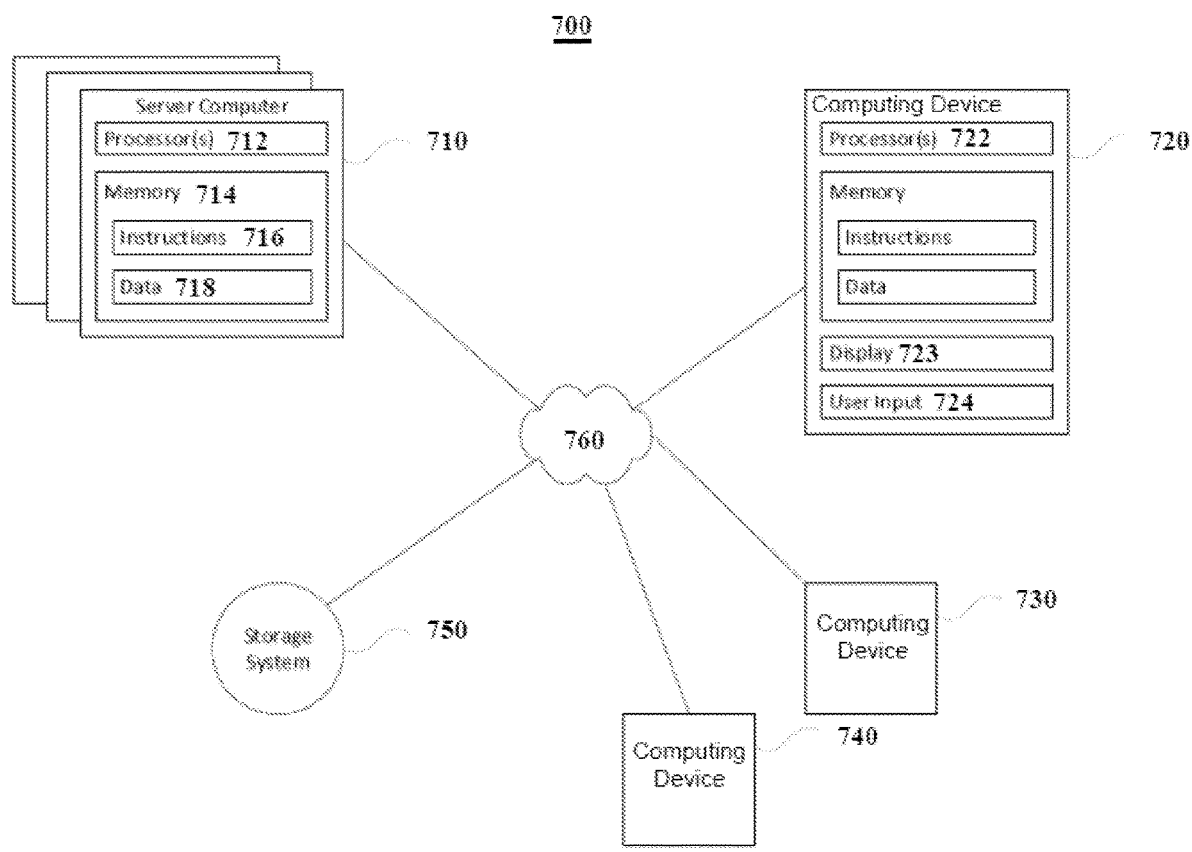
FIG. 4 is a functional diagram of an example system in accordance with aspects of the disclosure.

FIG. 4 shows an example computing system 700 in which the features described herein may be implemented. It should not be considered as limiting the scope of the disclosure or usefulness of the features described herein. In this example, system 700 may include server computing device 710 and computing devices 720, 730, 740 (collectively "computing devices") as well as storage system 750. Server computing device 710 may contain one or more processors 712, memory 714, and other components typically present in general purpose computing devices.

Memory 714 of server computing device 710 may store information accessible by the one or more processors 712, including instructions 716 that can be executed by the one or more processors 712. The memory 714 may also store data 718 that can be retrieved, manipulated or stored by one or more processors. The memory 714 may include any non-transitory type capable of storing information accessible by the processor, such as a hard-drive, memory card, ROM, RAM, DVD, CD-ROM, a tape drive, write-capable, and read-only memories.

The instructions 716 may be any set of instructions to be executed directly, such as machine code, or indirectly, such as scripts, by the one or more processors. In that regard, the terms "instructions," "kernels," "applications," "steps," and "programs" can be used interchangeably herein. The instructions can be stored in object code format for direct processing by a processor, or in any other computing device language including scripts or collections of independent source code modules that are interpreted on demand or compiled in advance. For example, instructions 716 may include scanning an image for bar codes and retrieving a serial number associated with that bar code. Moreover, instructions 716 may include scanning an image to verify whether an object within the image includes any defects, such as a disk misalignment, broken parts, or the like. Functions, methods, and routines of the instructions are explained in more detail below.

Data 718 may be retrieved, stored, and modified by the one or more processors 712 in accordance with the instructions 716. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII, or Unicode. Moreover, the data can comprise any information sufficient to identify the relevant information, such as numbers, descriptive text, proprietary codes, pointers, references to data stored in other memories such as at other network locations, or information that is used by a function to calculate the relevant data. As an example, data 718 may include one or more images captured by cameras 250, 440, 800, 810. Additionally, data 718 may include a list of serial numbers that correspond to certain bar codes that are associated with components of a data center.

The one or more processors 712 can be any conventional processors, such as a commercially available CPU. Alternatively, the processors can be dedicated components such as an application specific integrated circuit ("ASIC") or other hardware-based processor. Although not necessary, server computing device 710 may include specialized hardware components to perform specific computing processes, such as decoding video or images, matching video frames with images, distorting videos or images, encoding distorted videos or images, etc. faster or more efficiently.

Although FIG. 4 functionally illustrates processor 712, memory 714, and other elements of server computing device 710 as being within the same block, the processor, computer, computing device, or memory can actually comprise multiple processors, computers, computing devices, or memories that may or may not be stored within the same physical housing. For example, memory 714 can be a hard drive or other storage media located in housings different from that of server computing device 710. Accordingly, references to a processor, computer, computing device, or memory will be understood to include references to a collection of processors, computers, computing devices, or memories that may or may not operate in parallel. For example, server computing device 710 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 760.

Each of the computing devices 710, 720, 730, 740 can be at different nodes of a network 760 and capable of directly and indirectly communicating with other nodes of network 760. Although only a few computing devices 710, 720, 730, 740 are depicted in FIG. 4, it should be appreciated that a typical system can include a large number of connected computing devices, with each different computing device being at a different node of the network 760.

Network 760 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. For instance, two or more computing devices, such as computing devices 710, 720, 730, 740, may communicate through a peer-to-peer communication protocol, with or without the use of an intermediate server. Although certain advantages are obtained when information is transmitted or received as noted above, other aspects of the subject matter described herein are not limited to any particular manner of transmission of information.

As an example, server computing device 710 may include web servers capable of communicating with storage system 750 as well as the other computing devices 710, 720, 730, 740 via network 760. For example, server computing device 710 may use network 760 to transmit and present information, such as a location of a defect on a server tray, to a user on a display, such as display 721 of computing devices 710, 720, 730, 740.

Each of the computing devices 710, 720, 730, 740 may be configured similarly to server computing device 710, with one or more processors, memory, data, and instructions as described above. As such, computing devices 710, 720, 730, 740 may perform all of the steps described herein without communicating with server computing device 710. Each computing device 710, 720, 730, 740 may be a personal computing device intended for use by a user and have all of the components normally used in connection with a personal computing device such as a central processing unit (CPU), memory (e.g., RAM and internal hard drives) storing data and instructions, a display such as display 723 (e.g., a monitor having a screen, a touch-screen, a projector, a television, or other device that is operable to display information), and user input device 724 (e.g., a mouse, keyboard, touch-screen, or microphone).

Although the computing devices 710, 720, 730, 740 may each comprise a full-sized computing device, they may alternatively comprise mobile computing devices capable of exchanging data with a server, such as server computing device 710, over a network such as the Internet and/or computing devices capable of exchanging data with other computing devices, such as over a network. By way of example only, computing device 720 may be a mobile phone, wearable device or a device such as a wireless-enabled PDA, tablet PC, or a netbook that is capable of obtaining information via the Internet. In another example, computing device 730 may be a tablet PC. In an additional example, computing device 740 may be a laptop computer.

As with memory 714, storage system 750 can be of any type of computerized storage capable of storing information accessible by the server computing devices 710, such as a hard-drive, memory card, ROM, RAM, DVD, CD-ROM, write-capable, and read-only memories. In addition, storage system 750 may include a distributed storage system where data is stored on a plurality of different storage devices which may be physically located at the same or different geographic locations. Storage system 750 may be connected to the computing devices via the network 760 as shown in FIG. 4 and/or may be directly connected to any of the computing devices 710, 720, 730, 740.

In addition to the operations described herein, various operations will now be described with reference to FIGS. 1-4 and 6-13, and with specific reference to flowchart 900 depicted in FIG. 5. It should be understood that the following operations do not have to be performed in the precise order described below. Rather, various steps can be handled in a different order or simultaneously, and steps may also be added or omitted.

Computing device 710 can receive an order to replace an object, such as one or more hard disks 1200 housed within a server tray 1100, as depicted in FIGS. 6-13. Such an order can involve the component being removed from use in the data center and transported along conveyor system 1000. For example, this can include removing server tray 1100 from use in the data center and having one or more hard disks 1200 removed from the server tray. This order can include a list of serial numbers corresponding to server tray 1100 and hard disks 1200.

Figure 6:
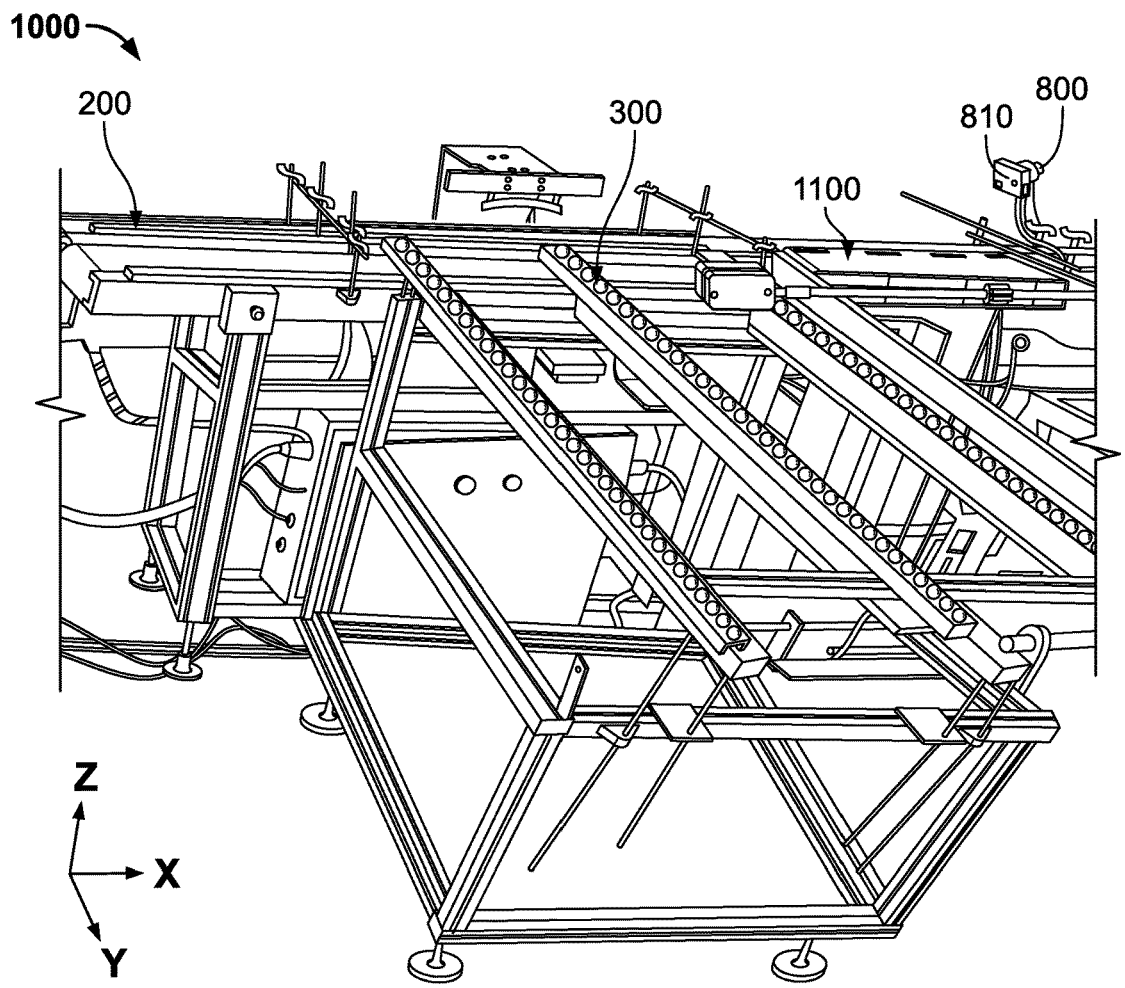
FIG. 6 is an isolated view of a portion of the conveyor system of FIG. 1 performing the method in accordance with aspects of the disclosure.

With reference to block 910 and FIGS. 6-7, camera 800 can capture a first image 1300 of an object, such as server tray 1100, being transported along first conveyor belt 100 in an X-direction from a start point to an end point of the first conveyor belt. As depicted in FIG. 7, first image 1300 includes bar codes 1310, 1320 with a server tray image 1100a representing server tray 1100 and hard disks image 1200a representing hard disks 1200. Computing device 710 can identify server tray image 1100a and hard disks image 1200a by referencing first image 1300 to an image generated from a machine learning or computer vision process.

Using the first image 1300, one or more processors 712 of computing device 710 can execute instructions 716 to scan and identify bar codes 1310, 1320 within first image 1300 that are located on a server tray image 1100a and hard disks image 1200a. For example, computing device 710 can identify a first bar code 1310 located on server tray image 1100a and a second set of bar codes 1320 located on each hard disk image 1200a. From these bar codes 1310, 1320, computing device 710 can retrieve a first serial number from data 718 associated with the first bar code 1310 and a second set of serial numbers associated with the second set of bar codes 1320 according to processes known in the art. In this manner, a first serial number can be associated with server tray 1100 and a second set of serial numbers can be associated with the plurality of hard disks 1200 based on the first image.

With reference to block 920, computing device 710 can check the first serial number and the second set of serial numbers against a reference list of serial numbers based on first image 1300, as listed on the initial order sent to computing device 710. In this manner, computing device 710 can confirm that the object, such as server tray 1100 housing the plurality of hard disks 1200, is the correct data center components to be replaced. If server tray 1100 and hard disks 1200 are not the correct components of the data as listed on the initial order received by computing device 710, the server tray and hard disks can be flagged as being the incorrect object and sent along the rest of conveyor system 1000 to be retrieved by an operator or robot, such as to first drop-off station 300 from egress station 200.

Figure 8:
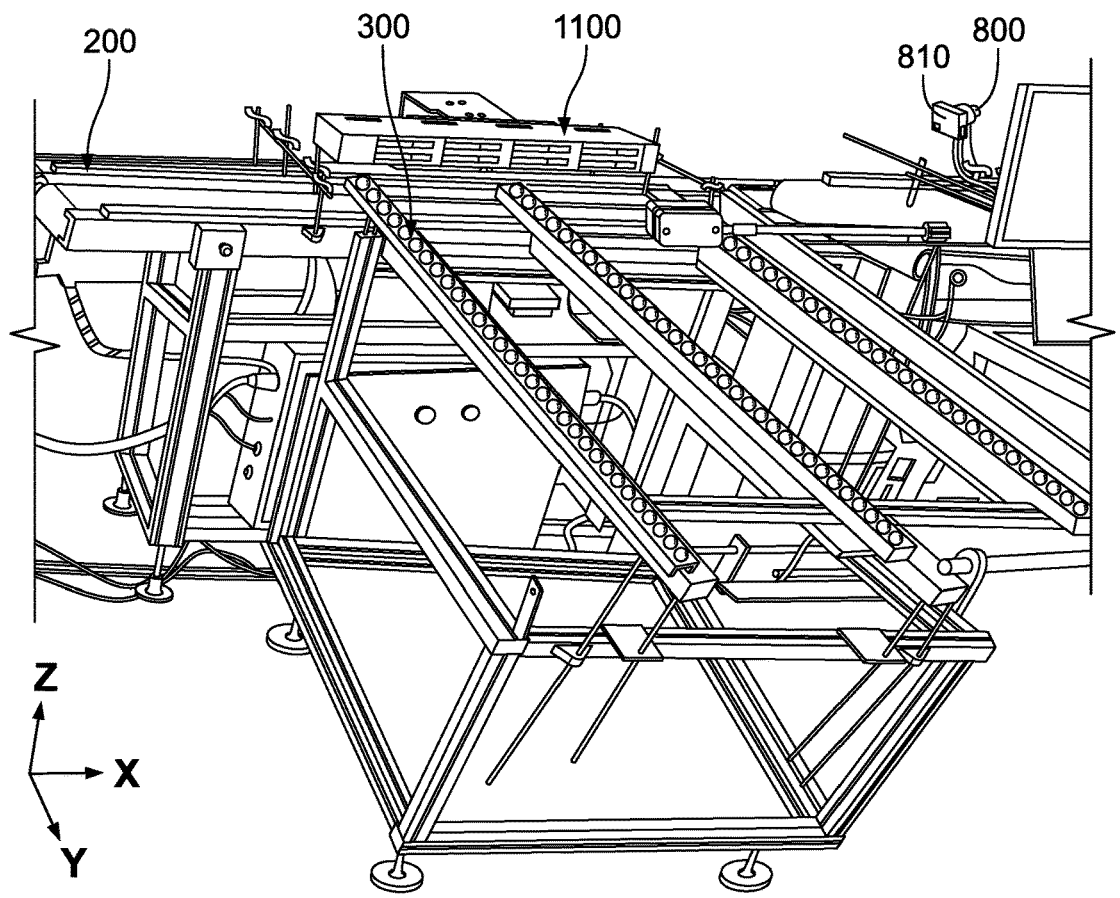
FIG. 8 is an isolated view of a portion of the conveyor system of FIG. 1 performing the method in accordance with aspects of the disclosure.

If computing device 710 confirms that the object is the correct object according to the initial order, turning to FIG. 8 and with reference to block 930, second camera 810 captures a second image of the object, such as server tray 1100, to be sent to computing device 710 to analyze the second image for any defects. Computing device 710 first identifies an image portion in the second image corresponding to the object.

With reference to block 940, computing device 710 can then verify an integrity status of the object based on the second image. The identified image portion corresponding to the object is compared to a reference image depicting an ideal or optimal integrity status of the object. The object shown in the reference image can be shown without any defects or other visible physical malformations. This reference image can be formed using a machine learning or computer vision algorithm. In this manner, computing device 710 can detect any differences between the object identified in the image portion of the second image and the object in the reference image. Computing device 710 can classify any differences between the images as a defect. In one example, where the object is server tray 1100 housing a plurality of hard disks 1200, computing device 710 can identify a server image 1100a corresponding to at least one of the server tray or hard disks image 1200a corresponding to the plurality of hard disks. In other examples, the image portion may include both the server tray and hard disks. Additionally, using machine learning the system can be automatically tuned to detect more and different types of defects. For example, in some instances the system may detect defects that do not match up known defects. The system can then add these defects to its data processing model so that future detection of these defects can be detected and dealt with.

The integrity status includes the physical state of the object and whether there are any defects that might indicate there is an issue with the object's physical state. For example, where the object is server tray 1100 and hard disks 1200, defects in the integrity status of the server tray and hard disks can include any misalignment of the hard disks within the server tray, whether are any missing or loose parts, whether any parts are broken (e.g., any broken isolators), or any other indication that the physical states of the server tray and hard disks are not optimal or ideal.

This verification step can be performed after the object is being transferred from first conveyor belt 100 to egress station 200 although, in other examples, this verification step can be performed as the object is being transferred. Where second camera 810 is located along first conveyor belt 100 and prior to the end point of the first conveyor belt, this verification step can be performed during or prior to the object being transferred to egress station 200 such transfer. However, in another example, where second camera 810 is located at the end point of first conveyor belt 100, or coupled to an end of egress station 200 adjacent the end point of the first conveyor belt, the verification step can be performed after the object is transferred to the egress station.

Where no defects are detected, the second image may be substantially similar to first image 1300. However, where a defect(s) is detected, computing device 710 can categorize the type or class of defect. For example, turning to FIG. 9 where the object is server tray 1100 housing hard disks 1200, and image 1400 includes server tray image 1100b and hard disk image 1200b with defect image 1450, computing device 710 can categorize the class of defect associated with the hard disks based on the defect image representing that defect. Defect image 1450 can indicate that hard disks 1200 has some damage that needs repairing rather than simply being replaced. In other examples, computing device 710 can categorize the type of defect as a misaligned hard disk, a missing part, or the like.

Computing device 710 can additionally highlight the location of defect image 1450 through a notation 1460 on image 1400. In this manner, an operator or robot can more quickly find the location of the defect on server tray 1100 or hard disks 1200 based on notation 1460 on image 1400. Moreover, computing device 710 can note the type of defect that exists when sending server tray 1100 and hard disks 1200 to be fixed. In this manner, the operator or robot can know what type of defect to look for and work on defects that the defect can be more efficiently fixed.

Computing device 710 can detect, categorize, and note down the location of a defect through processors 712 executing instructions 716 that includes a machine learning algorithm. For instance, a computer vision algorithm can be trained to notice different types of common defects on an object based on a detected defect image portion on an image containing the object. These defects can then be given a label by the algorithm or the developer of the algorithm so that, when computing device 710 executes the algorithm, the computing device can recognize the type of defect based on a provided image 1400 and defect image 1450.

In one example, computing device 710 may be continuously updating instructions 716 to improve the defect detection, categorization, and notation based on the images received from cameras 250, 440, 800, 810 in a reiterative machine learning algorithm. For example, computing device 710 can classify the defect type of a defect image as being a missing part and, if an operator or robot receives the server tray and confirms the accuracy of this classification, the computing device can update instructions 716 to increase the chances that a similar type of classification will be made based on similar defect images. In other examples, computing device 710 does not continuously update instructions 716 as the algorithm provided to the computing device is already trained by a machine learning algorithm prior to being implemented with the computing device. Implementing such a machine learning algorithm to detect, categorize, or note such defects is beneficial as the defect images can be difficult or impossible to detect with human eyes due to the size and nuance of the defect image, or the performance of such can be performed at much greater speeds than a human would be able to.

In one example, with reference to FIG. 2 and camera 250, the object may be received on platform 220 prior to the verification step. First stop 230 can be raised along a Z-direction by actuator 231 to prevent the object from traveling past platform 200 along the X-direction. Platform 220 can be raised along a Z-direction through a first actuator (not shown) such that the object is substantially orthogonal to a direction of the lens of camera 250, similar to server tray 1100 depicted in FIG. 8, so that camera 250 can capture a second image having a profile view of the object. The verification step can then be performed to determine whether the object has a defect or is the correct object that was initially assigned to be removed, based on the second image, while the object is at this elevated height. Where computing device 710 determines that the object includes a defect, or is not the correct object initially assigned to be removed, and requires the object be transferred to a different station to be worked on, such as first drop-off station 300, this elevated height can be particularly beneficial as the height of a top surface of the second drop-off station can be in line with this elevated height. In this manner, the object may immediately be transferred to first drop-off station 300 by actuator 210 actuating pusher 240 so that the object is pushed off from platform 220 along the Y-direction directly onto the second drop-off station to be retrieved by an operator or robot to be worked on. If computing device 710 determines that the object does not have a defect, platform 220 can be lowered to its starting position to transfer the object to the next station. In other examples, platform 220 is not raised to an elevated height and, instead, remains substantially level with the plane defined by a surface of egress station 200 during the verification process.

If computing device 710 does not detect that the object has a defect, the object can be transferred from egress station 200 to disassembly station 400, as depicted in FIG. 3. Specifically, platform 220 can travel along the length of egress station 200 along the X-direction to transfer the object to conveyor portion 410 of disassembly station 400. The object can then be transported along a path defined by conveyor portion 410 by pusher 450 engaging the object and pushing the object along the X-direction towards work portion 420.

Figure 10:
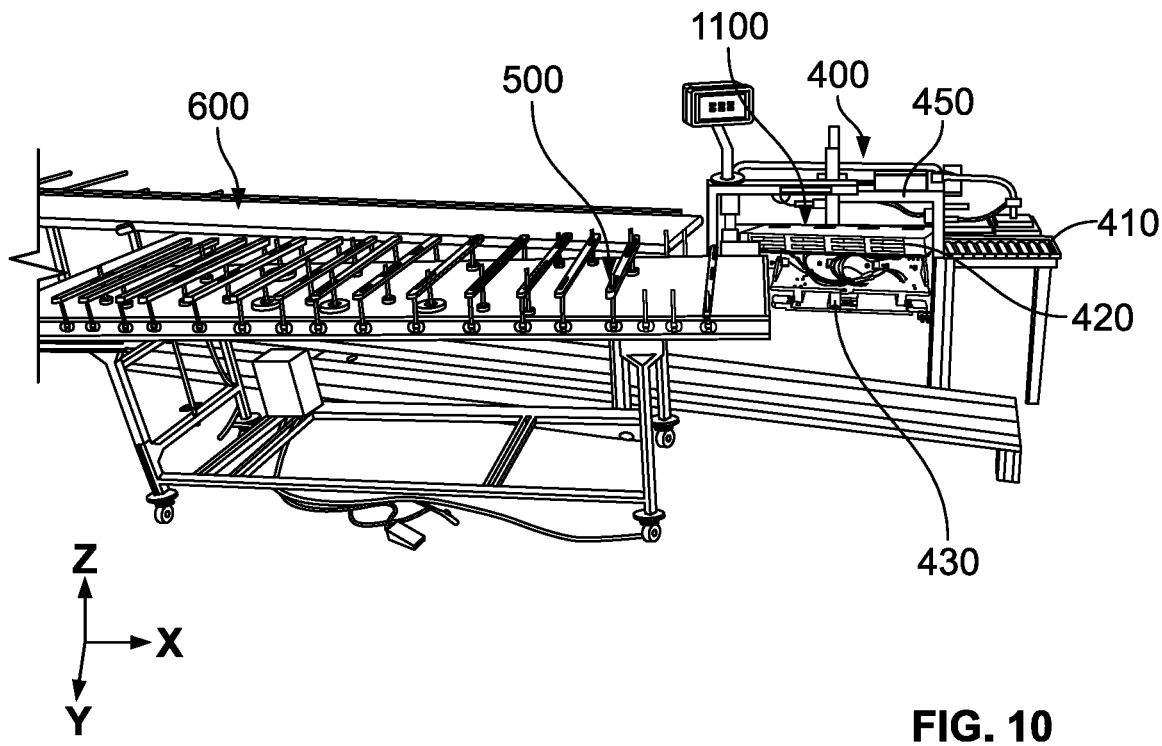
FIG. 10 is an isolated view of a portion of the conveyor system of FIG. 1 performing the method in accordance with aspects of the disclosure.

Turning to FIG. 10, once the object reaches work portion 420, the serial number of the object can again be re-checked similar to the identifying and checking steps of blocks 920. For example, where the object is server tray 1100 including a plurality of hard disks 1200, the server tray can be received on work platform 421. Similar to camera 810, cameras 440 can take an image, similar to first image 1300, to be sent to computing device 710. Computing device 710 scans and identifies a first bar code on the server tray image and a second set of bar codes on the hard disks image to retrieve the first serial number associated with the server tray 1100 and the second set of serial numbers associated with the plurality of hard disks 1200 based on the image. Computing device 710 can then check the first serial number and the second set of serial numbers against the reference list of serial numbers, as listed on the initial order sent to computing device 710. Similar to above, if server tray 1100 and hard disks 1200 are identified as not being the correct items listed in the initial order, the server tray and hard disks can be flagged as such and sent along conveyor system 1000.

If server tray 1100 and hard disks 1200 are identified as being the correct items listed in the initial order, the hard disks can be removed from the server tray, as discussed below. In other examples, computing device 710 can additionally verify the integrity status of the object through the image taken by cameras 440. In a yet further example, this second re-checking step with cameras 440 may not be performed, and the object can be disassembled without checking again whether the object is in the initial order.

To disassemble the object, disassembler 430 can be pushed toward work platform 421 by actuator 433 along the Y-direction to engage the object, such as server tray 1100 including hard disks 1200. Second stop 424 can be raised by an actuator to prevent the object form moving too far along the X-direction and for the object to be appropriately aligned to be engaged by disassembler 430. Specifically, fingers 431 and grippers 432 can be received within server tray 1100 through various openings (not shown) defined in the server tray. Fingers 431 can assist in maintaining the position of server tray 1100 along work platform 421 the X-direction by laterally holding the server tray in place while also pushing the server tray against back stop 423 to hold the server tray in place along the Y-direction. Actuator 433 can actuate grippers 432 to engage with each individual hard disk 1200 in server tray 1100. In this manner, disassembler 430 can be translated away from server tray 1100 along the Y-direction and disengage from server tray 1100 while grippers 432 remains engaged with hard disks 1200 to remove the hard disks from the server tray, as depicted in FIG. 11.

In other examples, grippers 432 may not engage all hard disks 1200 in server tray 1100 and, instead, only a select number of the grippers will grasp the corresponding hard disk in the server tray. For instance, with continued reference to FIGS. 3 and 10, and for server tray 1100 housing four hard disks 1200 along the length of the server tray, the left-most hard disk and right-most hard disk can be engaged by the set of two grippers 432 along the left and right ends of disassembler 430 while the intermediate grippers does not engage the intermediate hard disks. As such, when disassembler 430 disengages from server tray 1100, only the left-most and right-most hard disks 1200 will be removed.

Figure 11:
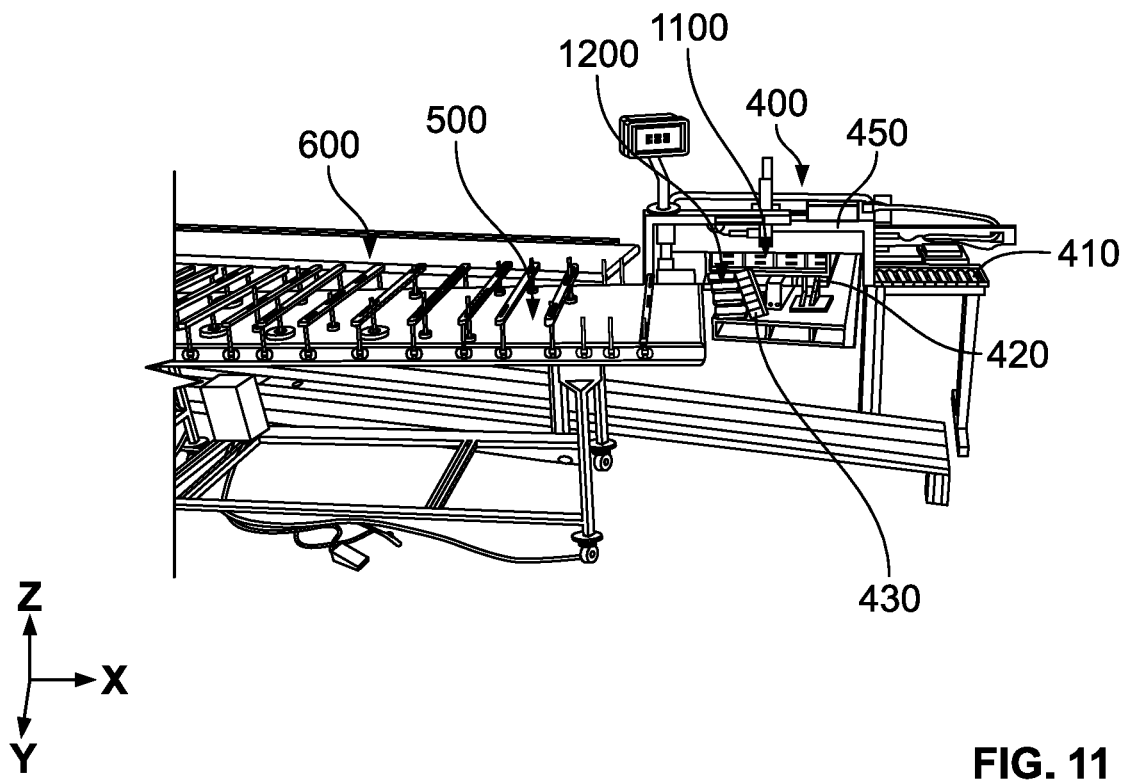
FIG. 11 is an isolated view of a portion of the conveyor system of FIG. 1 performing the method in accordance with aspects of the disclosure.
Figure 12:
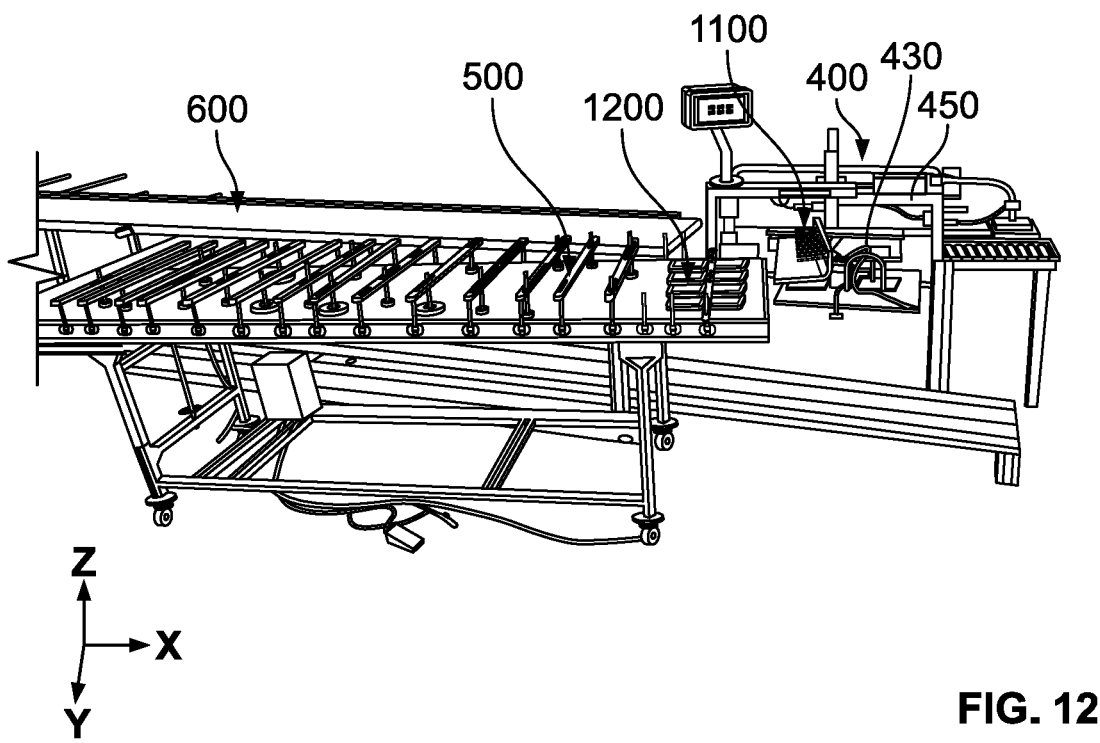
FIG. 12 is an isolated view of a portion of the conveyor system of FIG. 1 performing the method in accordance with aspects of the disclosure.
Figure 13:
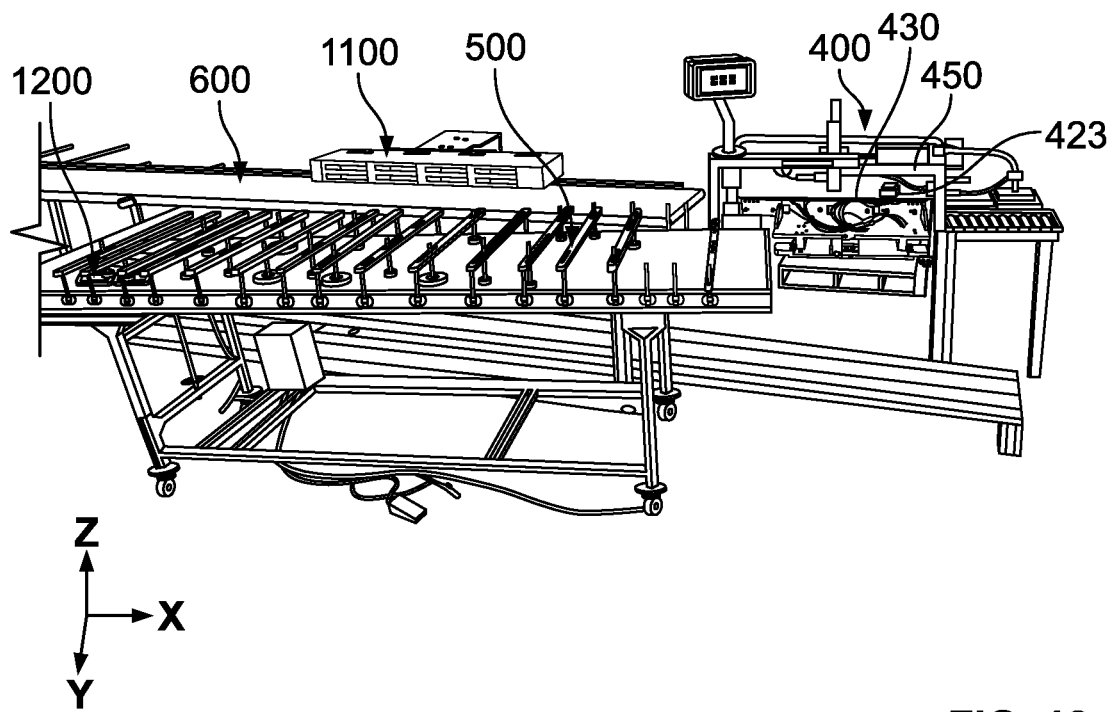
FIG. 13 is an isolated view of a portion of the conveyor system of FIG. 1 performing the method in accordance with aspects of the disclosure.

Turning to FIGS. 11-12, once hard disks 1200 are removed from server tray 1100, disassembler 430 may rotate about the Z-axis to face second drop-off station 500 and transfer the hard disks onto the second drop-off station. Meanwhile, turning to FIG. 13, the empty (or partially empty) server tray 1300 is then transferred to second conveyor belt 600 through pusher 450.

Replacing components of a data center is challenging, particularly in ensuring that the components pulled from the data center are the correct components noted as requiring replacement. Current methods of checking whether the pulled components are correct require a human operator to manually scan the bar code of each hard disk. Such a method of checking the pulled components is costly in both time and labor while also being prone to error.

Moreover, while the human operators scan the bar codes of the pulled component, they do not currently check for whether such components are damaged or possesses some other physical defect. Noting the type and location of such defects early on can save on costs in the long term as these defects can be fixed before they become a larger issue. Moreover, this verification can decrease the chance the component of the data center is damaged during replacement. For example, a defect can involve one or more hard disks being misaligned in a server tray and attempting to remove the misaligned hard disks may lead to a collision with the parts adjacent those hard disks; thus, potentially leading to greater overall damage of the surrounding hard disks or server tray.

The current disclosure automates the processes discussed above so that data center maintenance and labor costs can be reduced while also allowing for the data center to function more efficiently. Moreover, this automation allows for greater integration with future data and machine learning developments. Although the object to be replaced in the data center has been substantially in reference to a server tray including a plurality of hard disks, it is understood that the object may be any component within a data center.

Although the subject matter herein has been described with reference to particular examples, it is to be understood that these examples are merely illustrative of the principles and applications of the subject matter described. It is therefore to be understood that numerous modifications may be made and that other arrangements may be devised without departing from the spirit and scope as defined by the appended claims.

The invention claimed is:

1. A method of using a conveyor system comprising:
capturing, with a camera of the conveyor system, an image of a server tray and a plurality of hard disks received along a conveyor of the conveyor system;
verifying an integrity status of the server tray and plurality of hard disks based on the image;
if a defect is not found in course of the verifying, transferring the server tray to a first drop-off station; and
if a defect is found in the course of the verifying, classifying a defect type of a defect image portion of the image and transferring the server tray to a second drop-off station.

2. The method of claim 1, wherein, if a defect is found, the method further comprises transferring the server tray and the plurality of hard disks from the conveyor to the second drop-off station by an actuator.

3. The method of claim 1, wherein, if a defect is found, the method further comprises highlighting a location of the defect image portion through a notation on the image.

4. The method of claim 1, wherein, if a defect is found, the method further comprises providing the image for training a machine learning algorithm to recognize a type of defect.

5. The method of claim 1, wherein a camera direction of the camera faces in a downward direction in a Z-direction along an X-Z plane toward the server tray and the plurality of hard disks.

6. The method of claim 1, wherein, if a defect is not found, the method further comprises transferring the server tray and the plurality of hard disks from the first drop-off station to a disassembly station of the conveyor system.

7. The method of claim 6, further comprising:
removing the plurality of hard disks from the server tray; and
transferring the plurality of hard disks to the first drop-off station of the conveyor system.

8. The method of claim 6, further comprising:
removing at least one hard disk of the plurality of hard disks from the server tray without removing a set of hard disks of the plurality of hard disks from the server tray; and
transferring the at least one hard disk, without the set of hard disks, to the first drop-off station.

9. The method of claim 1, wherein the camera is a first camera, the method further comprising:
capturing, with a second camera of the conveyor system, a second image of the server tray and the plurality of hard disks received along the conveyor; and
checking, with one or more processors of the conveyor system, a first serial number associated with the server tray and a second set of serial numbers associated with the plurality of hard disks against a reference list of serial numbers.

10. The method of claim 9, wherein a direction of the second camera faces substantially parallel to a plane defined by a conveyor belt of the conveyor system.

11. A conveyor system comprising:
a first conveyor belt coupled to a camera;
a first drop-off station;
a second drop-off station;
memory configured to store at least one of instructions or data; and
one or more processors operatively coupled to the memory, the one or more processors being configured to:
capture, with the camera, an image of a server tray and a plurality of hard disks received along the conveyor belt of the conveyor system;
verify an integrity status of the server tray and plurality of hard disks based on the image;
if a defect is not found in the course of the verifying, cause a transfer of the server tray to the first drop-off station; and
if a defect is found in course of the verifying, classify a defect type of a defect image portion of the image and transferring the server tray to the second drop-off station.

12. The conveyor system of claim 11, wherein the one or more processors are further configured to, if a defect is found, cause a transfer of the server tray and the plurality of hard disks from the conveyor to the second drop-off station by an actuator.

13. The conveyor system of claim 11, wherein the one or more processors are further configured to, if a defect is found, highlight a location of the defect image portion through a notation on the image.

14. The conveyor system of claim 11, wherein the one or more processors are further configured to, if a defect is found, provide the image for training a machine learning algorithm to recognize a type of defect.

15. The conveyor system of claim 11, wherein a camera direction of the camera faces in a downward direction in a Z-direction along the X-Z plane toward the server tray and the plurality of hard disks.

16. The conveyor system of claim 11, further comprising a disassembly station,
wherein one or more processors are further configured to, if a defect is not found, cause a transfer of the server tray and the plurality of hard disks from the first drop-off station to the disassembly station.

17. The conveyor system of claim 16, wherein the conveyor system further comprises a second conveyor belt coupled to the disassembly station, the disassembly station includes a disassembler configured to:
  remove the plurality of hard disks from the server tray; and
  transfer the plurality of hard disks to the second drop-off station.

18. The conveyor system of claim 16, wherein the disassembly station includes a disassembler configured to:
  remove at least one hard disk of the plurality of hard disks from the server tray without removing a set of hard disks of the plurality of hard disks from the server tray; and
  transfer the at least one hard disk, without the set of hard disks, to the first drop-off station.

19. The conveyor system of claim 11, wherein the camera is a first camera,
  wherein the conveyor system further comprises a second camera, and
  wherein the one or more processors are further configured to:
  capture, with the second camera, a second image of the server tray and the plurality of hard disks received along the conveyor; and
  check a first serial number associated with the server tray and a second set of serial numbers associated with the plurality of hard disks against a reference list of serial numbers.

20. The conveyor system of claim 19, wherein a direction of the second camera faces substantially parallel to a plane defined by the first conveyor belt of the conveyor system.

* * * * *